(12) United States Patent
Aher et al.

(10) Patent No.: US 12,347,428 B2
(45) Date of Patent: Jul. 1, 2025

(54) SYSTEMS AND METHODS FOR GENERATING A DYNAMIC LIST OF HINT WORDS FOR AUTOMATED SPEECH RECOGNITION

(71) Applicant: Adeia Guides Inc., San Jose, CA (US)

(72) Inventors: Ankur Anil Aher, Maharashtra (IN); Jeffry Copps Robert Jose, Tamil Nadu (IN)

(73) Assignee: Adeia Guides Inc., San Jose, CA (US)

( * ) Notice: Subject to any disclaimer, the term of this patent is extended or adjusted under 35 U.S.C. 154(b) by 503 days.

(21) Appl. No.: 17/389,836

(22) Filed: Jul. 30, 2021

(65) Prior Publication Data

US 2023/0030830 A1    Feb. 2, 2023

(51) Int. Cl.
  *G10L 15/22*   (2006.01)
  *G10L 15/08*   (2006.01)
  G10L 25/45    (2013.01)

(52) U.S. Cl.
  CPC .............. *G10L 15/22* (2013.01); *G10L 15/08* (2013.01); *G10L 2015/088* (2013.01); *G10L 25/45* (2013.01)

(58) Field of Classification Search
  CPC ......... G10L 15/22; G10L 15/00; G10L 15/01; G10L 15/02; G10L 15/025; G10L 15/027; G10L 15/06; G10L 15/065; G10L 15/08; G10L 15/187; G10L 15/20; G10L 15/26; G10L 15/28; G10L 2015/025; G10L 2015/027; G10L 2015/0631–0638; G10L 2015/221–228

USPC ....... 704/231, 235, 243, 244, 245, 250, 255, 704/257, 270, 275
See application file for complete search history.

(56) References Cited

U.S. PATENT DOCUMENTS

| | | | |
|---|---|---|---|
| 6,393,399 B1 * | 5/2002 | Even ................. | G10L 15/193 704/235 |
| 10,902,197 B1 * | 1/2021 | Lakshmanan ......... | G06F 40/205 |
| 2007/0027693 A1 * | 2/2007 | Hanazawa ............. | G10L 15/32 704/275 |

* cited by examiner

*Primary Examiner* — Qi Han
(74) *Attorney, Agent, or Firm* — Haley Guiliano LLP

(57) ABSTRACT

Systems and methods are provided for determining hint words that improve the accuracy of automated speech recognition (ASR) systems. Hint words are typically determined in the context of a user issuing voice commands in connection with a voice interface system, however, a voice interface system may capture terms from overheard content and/or conversations. A system may determine a sliding window of hint words using set of qualifier rules. The system may capture audio, e.g., from a conversation or played back content, as a first input and decipher a plurality of words including a qualifying first term added to the hint words. The voice interface system may capture more audio as a second input and decipher a second plurality of words including a qualifying second term. The first term may be removed from the set of hint words, e.g., when the second term is added or after an expiration time.

19 Claims, 8 Drawing Sheets

500

| NEW PHRASE | en-US | FLAC | |
|---|---|---|---|
| xyz:// ... / new phrase.flac | 2021-06-25 1:02 PM | | ~570 |

| PHRASE N (562) | en-US (564) | FLAC (565) | |
|---|---|---|---|
| xyz:// ... / phraseN.flac (566) | 2021-06-25 12:47 PM (568) | | ~560 |

| PHRASE 5 | en-US | FLAC | |
|---|---|---|---|
| xyz:// ... / phrase5.flac | 2021-06-25 10:29 AM | | ~550 |

| PHRASE 4 | en-US | FLAC | |
|---|---|---|---|
| xyz:// ... / phrase4.flac | 2021-06-25 10:28 AM | | ~540 |

| PHRASE 3 | en-US | FLAC | |
|---|---|---|---|
| xyz:// ... / phrase3.flac | 2021-06-25 10:24 AM | | ~530 |

| PHRASE 2 | en-US | FLAC | |
|---|---|---|---|
| xyz:// ... / phrase2.flac | 2021-06-25 10:24 AM | | ~520 |

| PHRASE 1 | en-US | FLAC | |
|---|---|---|---|
| xyz:// ... / phrase1.flac | 2021-06-25 10:18 AM (518) | | ~510 |

FIG. 5

SYSTEMS AND METHODS FOR GENERATING A DYNAMIC LIST OF HINT WORDS FOR AUTOMATED SPEECH RECOGNITION

RELATED APPLICATIONS

This application is related to applicant's co-pending U.S. patent application Ser. No. 16/590,243 filed Oct. 1, 2019 entitled "Method and Apparatus for Generating Hint Words for Automated Speech Recognition" and U.S. patent application Ser. No. 16/590,244 filed Oct. 1, 2019 entitled "Method and Apparatus for Generating Hint Words for Automated Speech Recognition," the disclosures of which are hereby incorporated in their entirety by reference thereto.

BACKGROUND

The present disclosure relates to automated speech recognition, and more particularly to systems and methods of generating a dynamic list of hint words for automated speech recognition.

SUMMARY

Automatic Speech Recognition (ASR) plays a significant role in voice-based systems. ASR may use "hint words," e.g., a limited set of words that may be taken as input for a speech-to-text conversion session in addition to an actual audio signal. Hint words are typically determined in the context of a user issuing voice commands in connection with a voice interface system, however, a voice interface system may also capture terms from overheard content and/or conversations. Terms may appear in queries soon after capturing the terms from content and/or conversations, but the list of hint words would grow too large, too quickly. The size of a list of hint words is limited, e.g., by memory and/or practicality of processing a large hint word list. With the architecture of speech-to-text platforms limiting the amount of hint words available in ASR, a new way to identify and update the best hint words at a given time is necessary. A "sliding window" of hint words may be generated and updated with recently captured terms, while discarding the oldest terms. Queries to the voice interface system may be determined with the help of a dynamically updated hint word list to discern vocabulary captured from recent conversations and played back content, e.g., in the last few minutes, hours, or days.

Recent technological advances have allowed the somewhat widespread use of ASR tools, by which computing devices convert speech to text without human intervention. ASR tools have proven useful in numerous applications, including voice user interfaces that rely on speech to text tools to convert spoken commands to text that can be interpreted, and speech to text processing that allows people to perform word processing tasks without typing.

ASR currently suffers from significant limitations, however. Unassisted ASR tools often suffer from limited accuracy. In particular, ASR systems often have difficulty when dealing with words that sound identical or similar yet have different meanings such as "meet" and "meat", difficult to pronounce words that are often spoken incorrectly to the ASR tool, mispronounced words, and noise in the speech input signal. These and other factors result in decreased accuracy of the ASR system and user frustration.

Accordingly, to overcome the lack of accuracy in ASR systems, systems and methods are described herein for a computer-based process that generates hint words to assist in the automated speech recognition process. The use of hint words, or additional words input to the ASR system along with speech input, may help provide context for the spoken words and thus increases accuracy.

Generally, hint words may be identified from interactions with a voice interface system. In some approaches, speech to text operations may be carried out in relation to the use of a voice interface system. More specifically, users of voice interface systems may issue voice queries or commands to initiate various operations such as conduct an electronic search for information, purchase one or more products, direct the operation of various electronic devices, and the like. ASR systems interpreting these voice commands are aided by contextual information, which can be determined from prior operation of the voice interface system.

In some approaches, hint words are taken from terms that have arisen during operation of the voice interface system. This provides valuable context information for voice commands issued in connection with use of the voice interface system, thus improving the accuracy of any speech to text operations. These terms can be any terms of search queries spoken to the voice interface system, or any terms of commands uttered to the system. Terms can also be any other word or phrase, including terms such as names of consumer goods, tasks, reminders, calendar items, dates, or items of a list of items, as many of these may be uttered to voice interface systems.

In one approach, hint words for voice queries issued in connection with a voice interface system can be determined according to the most frequently occurring terms arising in operation of this voice interface system. These terms can be determined from any such operation. For example, terms can be selected from electronic search queries issued through the voice interface system. Terms can also be taken from commands issued through or to the voice interface system. These terms, or some subset thereof, can be selected as hint words for transmission to, and use by, e.g., an ASR application.

In some approaches, hint words can be taken from this set of terms based on use frequency. As one example, a predetermined number of the most frequently occurring terms may be selected as the hint words. For instance, the top 50, 100, or 1000 most frequently occurring terms may be used as hint words. As another example, hint words can be taken from a predetermined number of the terms that occur most frequently during some predetermined time period. Alternatively, a combination of the above two examples may be used to determine hint words. That is, a predetermined number of the most frequently occurring terms, and a predetermined number of the most frequently occurring terms over some particular time period, can be used as the hint words.

Only selecting hint words from electronic search queries and/or commands spoken is not always enough to help a voice interface system recognize difficult words. There exists a need to take terms for a hint word list from other sources that may be captured by the voice interface system.

Described herein are systems and methods of identifying and adding hint words from various audio sources, e.g., overheard content and conversations. For instance, a viewer may be watching a legal drama on television and vocabulary from a criminal trial may be used. A viewer—perhaps consciously or subconsciously—may adopt one or more courtroom terms when querying a voice interface system. For example, a viewer may ask a voice-enabled digital assistant for news about "precedents" or vacations ideas for a "sequestered" location.

In some cases, television or movie characters may discuss a made-up or nonsensical word. For instance, Joey on the TV show "Friends" played a character named "Dr. Drake Ramoray" on a fictionalized soap opera. Some embodiments may hear Joey say "Ramoray" and add it to a hint list. Without a hint word list, if a viewer were to request "episodes with Dr. Ramoray," a voice interface system would be all but hopeless; however, with "Ramoray" in a hint list, the query can efficiently be understood and answered.

In some cases, hint words may come from outside conversations overheard by a voice interface system. For instance, two people may be discussing fine wine near the voice interface system (e.g., a smartphone) and the device may overhear a visitor say, "The other night I enjoyed a 2011 bottle of Chateau Beaucastel Chateauneuf-Du-Pape." A few of these words may be added to a set of hint words. After the two conversationists go their separate ways, a user may ask the voice interface system, "How much is a 2011 bottle of Chateau Beaucastel Chateauneuf-Du-Pape?" and quickly hear a reply because, e.g., "Beaucastel" and/or "Chateauneuf-Du-Pape" were added to the hint word list during the earlier conversation.

A voice interface system should not just accept and add every overheard word as a hint word. There should be rules regarding when to adopt an overheard term as a hint word. A voice interface system may use qualifier rules to determine if a term should be added to the set of hint words. In some embodiments, qualifier rules may instruct on how terms qualify to be added to the hint words list. In some embodiments, qualifier rules may include meeting or exceeding a threshold for one of several criteria. For instance, a term with more than a few, e.g., 3, syllables may qualify. A term with a couple, e.g., at least two, phonetic matches may qualify. A word with several, e.g., four (or more), rhyming matches may qualify. A term with, e.g., (at least) two partial matches may qualify as well. In some embodiments, a difficulty score may be attributed to a term and, if the difficulty score meets or exceed a threshold, the word may qualify. For instance, a difficulty score may be calculated based on complexity of the term's definition or encyclopedia entry on, e.g., Wikipedia®, as well as the difficulty of terms that appear in those definitions.

Even with a discerning approach to accepting hint words, if a voice interface system is listening for hint words all the time, the list of hint words may grow too large, too quickly. The size of a list of hint words is limited, e.g., by memory and/or practicality of processing a large hint word list. A set of hint words may have a maximum capacity of, e.g., 50, 100, 1500 terms and/or phrases. With the architecture of speech-to-text platforms limiting the amount of hint words available in ASR, a new way to identify and update the best hint words at a given time is necessary. For instance, when a new term is added, and older term may be discarded. A set of hint words may be considered a sliding window of hint words dynamically updated to add the newest term and discard the oldest term.

In some embodiments, a set of hint words may be a FIFO data structure where a new term is added and the oldest term is discarded. In some embodiments, a set of hint words may have an expiration term (e.g., 2 hours, 48 hours, 5 days, etc.) as to when it should be removed based on timestamp for creation and/or last use of the term. For instance, a term from a set of hint words may be removed from the set automatically when, e.g., 3 days has passed since it was added (or last heard). In some embodiments, each term in a set of hint words may have a timestamp and an individual expiration term. In some embodiments, the set of hint words may not have a set limit of terms but may be pruned based on rules to optimize access and phrase comparisons. In some embodiments, if a hint word has been used before an expiration date, the term may be moved to another list of hint words, e.g., hint words from user queries.

In some embodiments, a voice interface system may determine hint words for automated speech recognition by generating a set of hint words, e.g., a hint word data structure and accessing a set of qualifier rules for determining if a term should be add to the set of hint words. Qualifier rules may include, e.g., a rule that for a term at least one of the following is greater than a predetermined threshold: syllable count, phonetic matches, rhyming matches, and partial matches. Qualifier rules may also include, e.g., a rule that a term is determined to be a difficult term according to a difficulty score calculated based on accessing a definition of the term.

In some embodiments, the voice interface system may capture audio, e.g., from a conversation or played back content, as a first input and decipher a plurality of words. The voice interface system may analyze each of the plurality of words in view of the qualifier rules and determine a first term from the plurality of words should be added to set of hint words. The voice interface system may then capture more audio, e.g., from more conversation or played back content, as a second input and decipher a second plurality of words. The voice interface system may analyze each of the second plurality of words in view of the qualifier rules and determine a second term from the plurality of words should be added to set of hint words. In some embodiments, the first term may be removed from the set of hint words. Removal of the first term may happen, e.g., when the second term is added, when the set of hint words reaches a size limitation, and/or when the first term reaches an expiration time.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which:

FIG. 5 depicts an illustrative data structure for hint words, in accordance with some embodiments of the disclosure;

DETAILED DESCRIPTION

Figure 1:
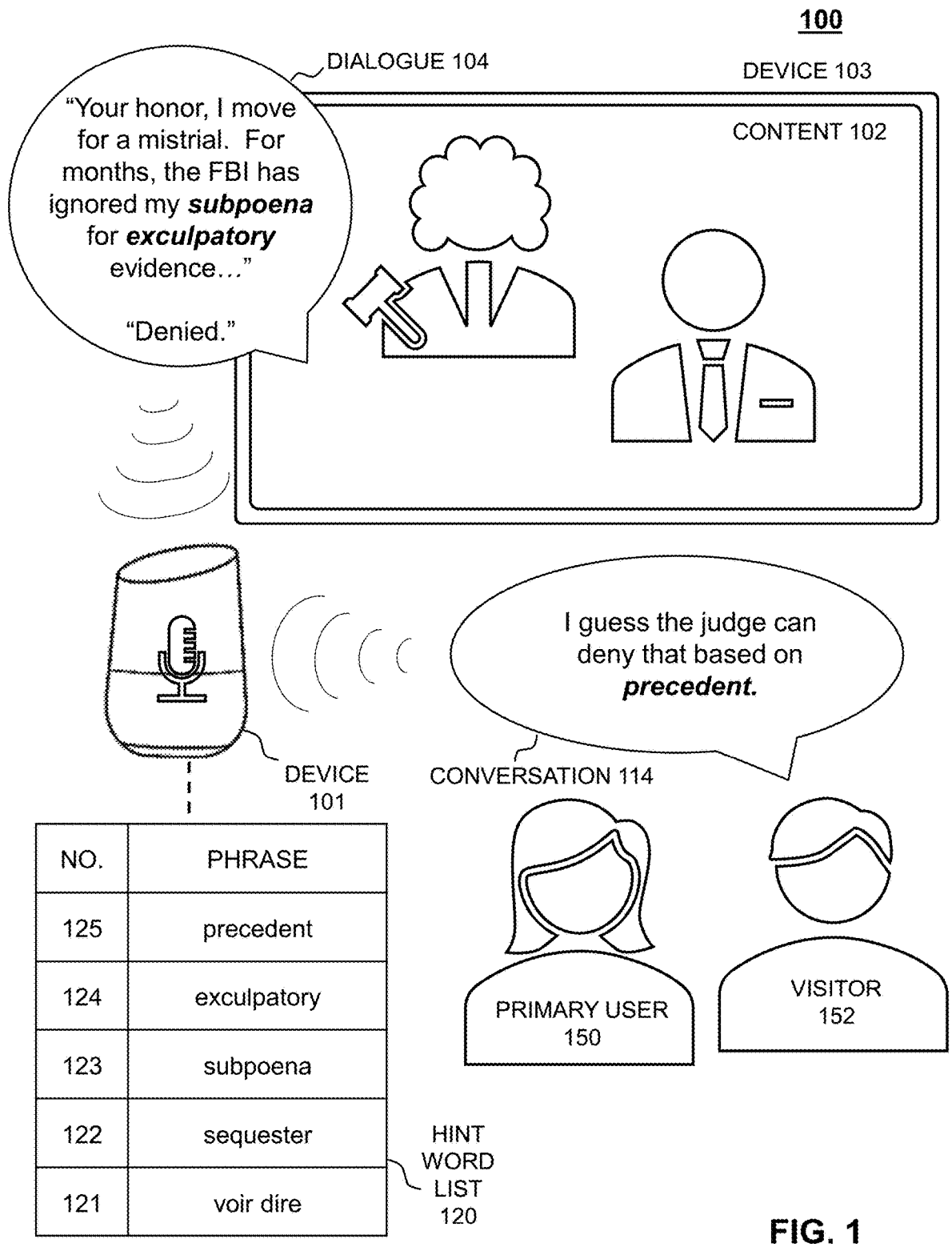
FIG. 1 illustrates an exemplary system updating a set of hint words, in accordance with embodiments of the disclosure.

FIG. 1 illustrates an exemplary system updating a set of hint words, in accordance with embodiments of the disclosure. For instance, a set of hint words may be updated based on terms captured from sources other than queries, such as from content or outside conversations. Scenario 100 of FIG. 1 illustrates device 101 listening to its surroundings, including sounds from a conversation and from device 102. By way of a non-limiting example, scenario 100 depicts capturing audio from content played back and a conversation to update a set of hint words, hint word list 120.

Figure 2:
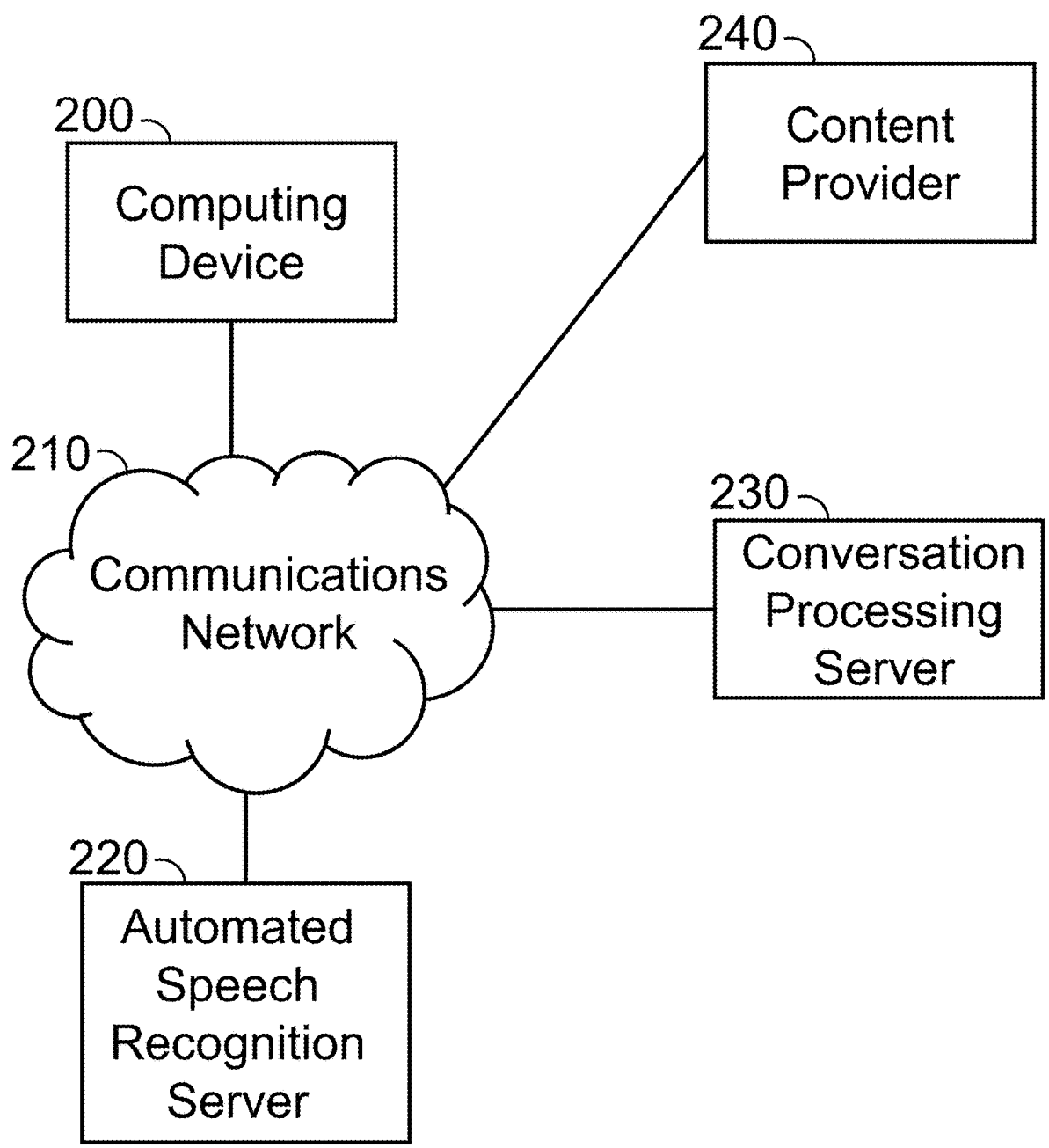
FIG. 2 is a diagram of an illustrative system for implementing processes of hint word determination in accordance with embodiments of the disclosure.
Figure 3:
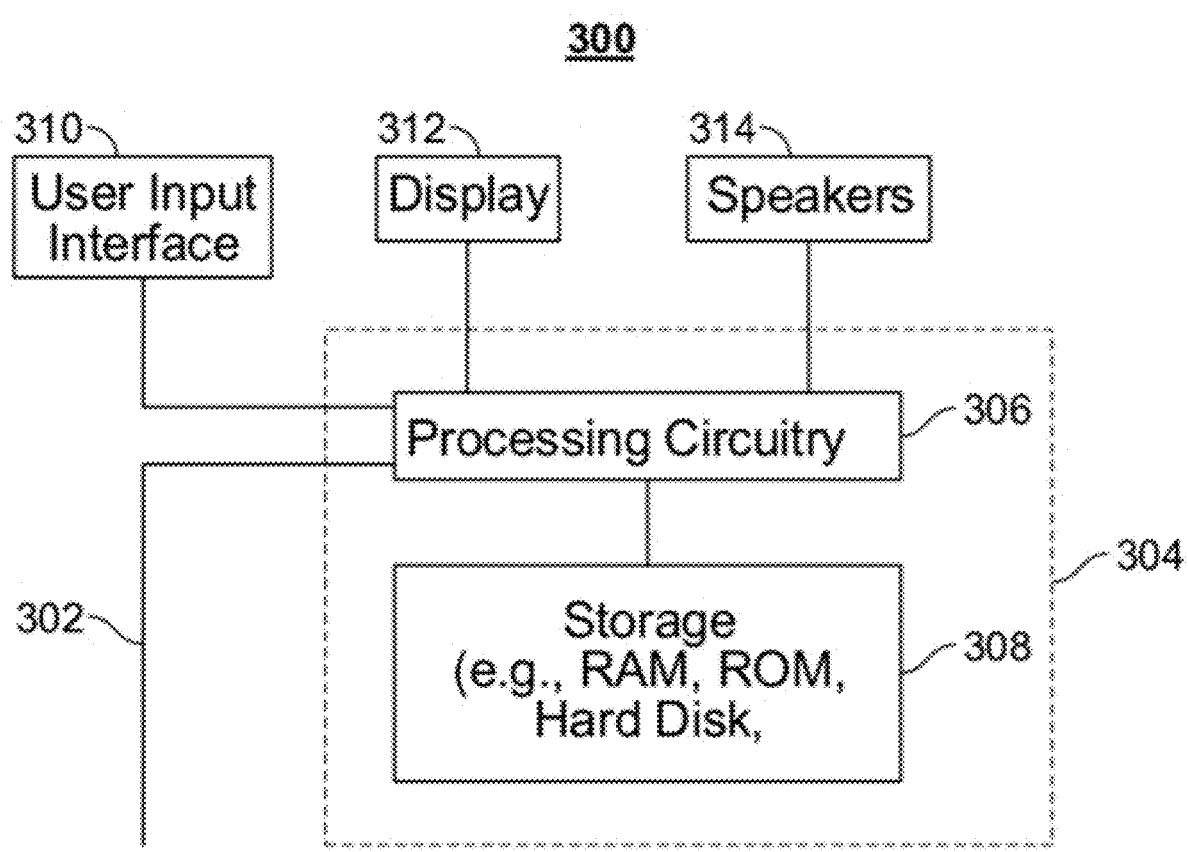
FIG. 3 is a diagram of illustrative electronic computing devices constructed for use according to embodiments of the disclosure.
Figure 4:
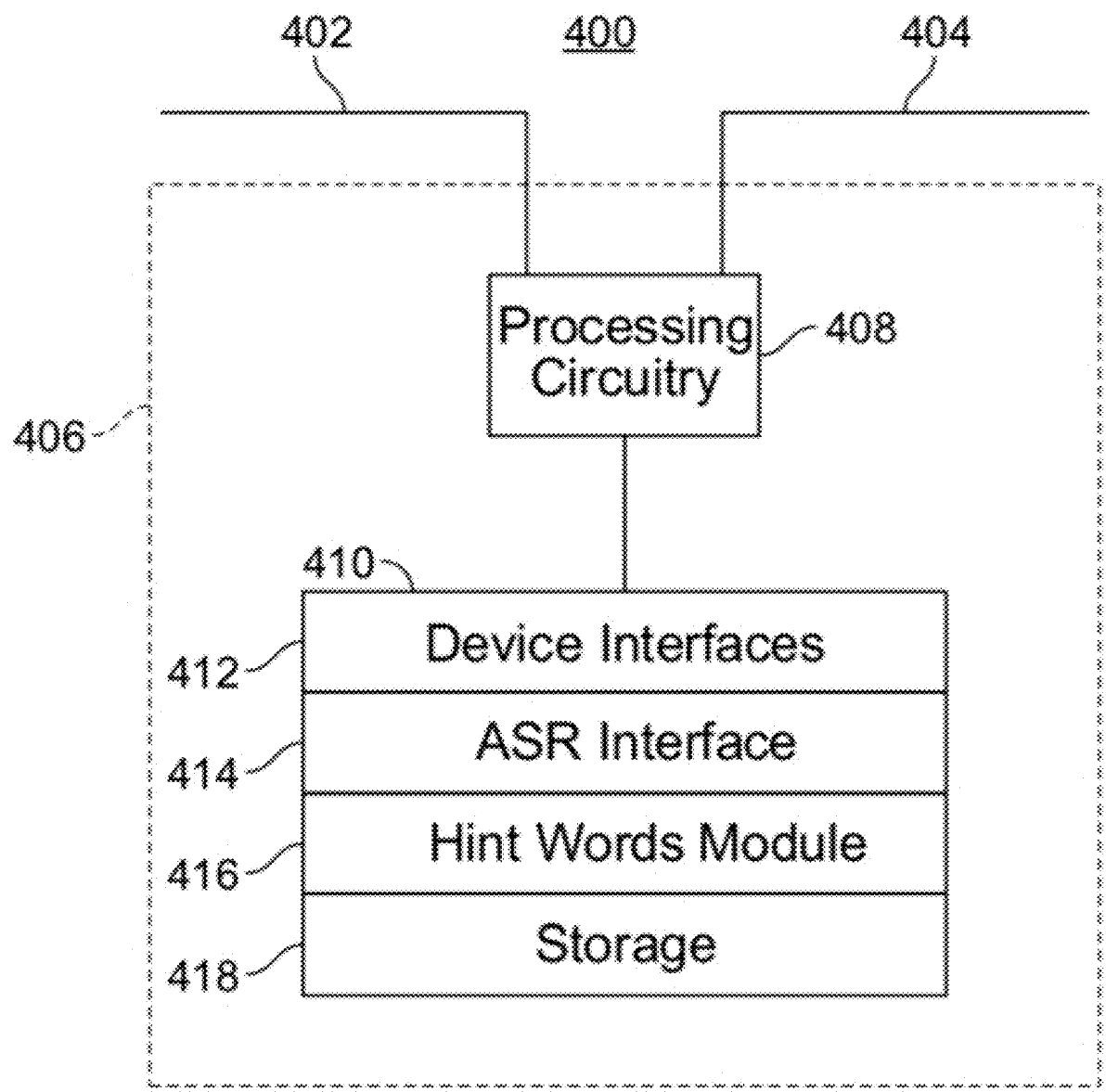
FIG. 4 is a diagram of an illustrative conversation processing server constructed for use according to embodiments of the disclosure.

Device 101 may be, for instance, a computing device with a smart home assistant, television, set-top box, computer, laptop, smartphone, tablet, speaker, microphone, or device and/or server such as those depicted in FIGS. 2-4.

In scenario 100, device 103 provides content 102. Device 103 may be, for instance, a television, set-top box, computer, smartphone, tablet, or other device able to access a content delivery network. Content 102 may be delivered via a content delivery system using one or more of cable, fiber, satellite, antenna, streaming over IP, wireless, or other content delivery methods. Content 102 may be captured live for live broadcast and/or streaming. Content 102, in scenario 100, is depicted to be a courtroom drama. Content 102 produces audio for dialogue 104. In scenario 100, dialogue 104 says, "Your honor, I move for a mistrial. For months, the FBI has ignored my subpoena for exculpatory evidence . . . " and "Denied." Device 101 captures the audio of dialogue 104. In some embodiments, device 101 may also capture text representation of dialogue 104 as, e.g., closed captions or subtitles, via a network connection. In some embodiments, device 101 may identify content 102 based on an audio fingerprint and cross-reference the content identifier to access text for dialogue 104 from, e.g., a script or transcript.

In scenario 100, primary user 150 and visitor 152 are consuming content 102 via device 103. Primary user 150 may be considered a user of device 101, e.g., making queries and requests to device 101 regularly. Primary user 150 and visitor 152 may be considered conversing and visitor 152 says, "I guess the judge can deny that based on precedent" in conversation 114.

Device 101 captures each of dialogue 104 and conversation 114. In some embodiments, device 101 automatically converts audio/voice to text for each of dialogue 104 and conversation 114. In some embodiments, device 101 transmits audio files to a server to convert audio/voice to text for each of dialogue 104 and conversation 114. From dialogue 104 and/or conversation 114, device 101 may identify all the words and analyze whether each term should be added to a set of hint words. Generally, device 101 uses qualifier rules to determine if a term should be added to the set of hint words. Process 600 of FIG. 6 and process 700 of FIG. 7 illustrate potential methods of using a set of qualifier rules to determine if one or more words qualify to be added to a set of hint words.

In scenario 100, device 101 determines that terms "subpoena" and "exculpatory" from dialogue 104 should be added to the hint word list 120. For instance, "subpoena" and "exculpatory" may be added due to a number of syllables above a threshold and/or a calculated difficulty score for each term. In some embodiments, if the word "subpoena" is determined to have at least, e.g., three words that rhyme with it qualifies for the hint list. For instance, if it is determined that "hyena," "arena," "demeanor," and others rhyme with "subpoena," then the term may qualify to be added to the hint list. The term "subpoena" is added to hint word list 120 as term 123. In some embodiments, if the word "exculpatory" is determined to have at least, e.g., two words that share portions or syllables with it, the term may qualify for the hint list. For instance, if it is determined that "exculpatory" is a partial match to, e.g., "culpability" and "exculpate," then the term may qualify to be added to the hint list. The term "exculpatory" is added to hint word list 120 as term 124.

In scenario 100, device 101 determines that term "precedent" from conversation 114 should be added to the hint word list 120. For instance, "precedent" may be added due to a number of syllables above a threshold and/or a calculated difficulty score for each term. In some embodiments, if the word "precedent" is determined to have at least, e.g., one word that is pronounced similarly, it may qualify for the hint list. For instance, if it is determined that "president" is pronounced similar to "precedent," then the term may qualify to be added to the hint list. The term "precedent" is added to hint word list 120 as term 125.

Figure 8:
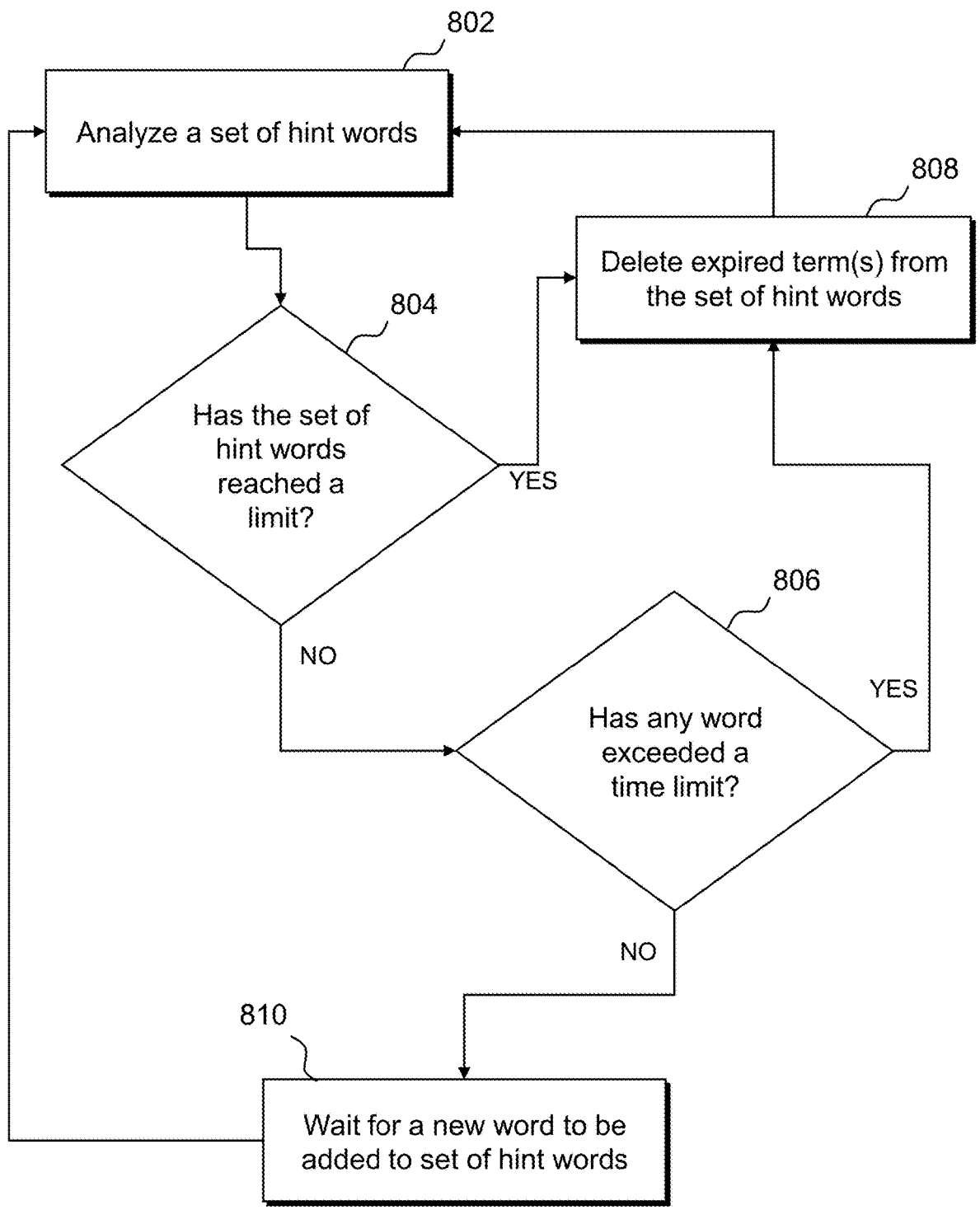
FIG. 8 depicts an illustrative flowchart of a process for removing terms from a set of hint words, in accordance with some embodiments of the disclosure.

Hint word list 120 is a set of hint words used by a voice assistant to assist in the automated speech recognition process. Another exemplary list of hint words is depicted in hint words data structure 500 of FIG. 5. In some embodiments, hint word list 120 may comprise many terms or phrases. For instance, hint word list 120 comprises term 121, "voir dire," and term 122, "sequester." Each of term 121 and 122 qualified to become hint words. Terms 121 and 122, however, appear at the bottom of hint word list 120. In some embodiments, a set of hint words may be a FIFO data structure where a new term is added to the list and the oldest term is discarded. In some embodiments, term 121 may need to be discard when term 125 is added. In some embodiments, a set of hint words may be considered a sliding window of hint words dynamically updated to add the newest term(s) and discard the oldest term(s). Process 800 of FIG. 8 illustrates a potential method of determining if one or more words from the plurality of words should be removed from a set of hint words.

FIG. 2 is a block diagram illustration of a system for implementing processes of hint word determination in accordance with embodiments of the disclosure. A computing device 200 may be in communication with an ASR server 220 through, for example, a communications network 210. ASR server 220 is also in electronic communication with conversation processing server 230 also through, for example, the communications network 210. Computing device 200 may be any computing device running a user interface, such as a voice assistant, voice interface allowing for voice-based communication with a user, or an electronic content display system for a user. Examples of such computing devices are a smart home assistant similar to a Google Home® device or an Amazon® Alexa® or Echo® device, a smartphone or laptop computer with a voice interface application for receiving and broadcasting information in voice format, a set-top box or television running a media guide program or other content display program for a user, or a server executing a content display application for generating content for display to a user. Computing device 200 may be in communication with one or more content providers 240 via communications network 210. ASR server 220 may be any server running an ASR application. Conversation processing server 230 may be any server programmed to determine hint words in accordance with embodiments of the disclosure, and to transmit the hint words to the ASR server 220. For example, conversation processing server 230 may be a server programmed to determine hint words by retrieving terms entered into computing device 200 when the user is operating device 200 to view content.

The computing device 200, e.g., device 100, may be any device capable of acting as a voice interface system such as by running one or more application programs implementing voice-based communication with a user, and engaging in electronic communication with server 230. For example, computing device 200 may be a voice assistant, smart home assistant, digital TV, laptop computer, smartphone, tablet computer, or the like. FIG. 3 shows a generalized embodiment of an illustrative user equipment device 300 that may serve as a computing device 200. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing its display, such as executing application programs that provide interfaces for content providers to stream and display content on display 312.

Control circuitry 304 may thus include communications circuitry suitable for communicating with a content provider 240 server (e.g., of FIG. 2) or other networks or servers. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Storage 308 may also store instructions or code for an operating system and any number of application programs to be executed by the operating system. In operation, processing circuitry 306 retrieves and executes the instructions stored in storage 308, to run both the operating system and any application programs started by the user. The application programs can include one or more voice interface applications for implementing voice communication with a user, and/or content display applications which implement an interface allowing users to select and display content on display 312 or another display.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

FIG. 4 is a generalized embodiment of an illustrative conversation processing server 230 constructed for use according to embodiments of the disclosure. Here, device 400 may serve as a conversation processing server. Device 400 may receive content and data via I/O paths 402 and 404. I/O path 402 may provide content and data to the various content consumption devices, such as devices 101 and 103 of FIG. 1, while I/O path 404 may provide data to, and receive content from, one or more content providers 240 of FIG. 2. Like the user equipment device 300, the device 400 has control circuitry 406 which includes processing circuitry 408 and storage 410. The control circuitry 406, processing circuitry 408, and storage 410 may be constructed, and may operate, in similar manner to the respective components of user equipment device 300.

Storage 410 is a memory that stores a number of programs for execution by processing circuitry 408. In particular, storage 410 may store a number of device interfaces 412, an ASR interface 414, hint words module 416 for retrieving terms from device 200 and selecting hint words therefrom, and storage 418. The device interfaces 412 are interface programs for handling the exchange of commands and data with the various devices 200. ASR interface 414 is an interface program for handling the exchange of commands with and transmission of hint words to various ASR servers 220. A separate interface 414 may exist for each different ASR server 220 that has its own format for commands or content. Hint words module 416 includes code for executing all of the above-described functions for selecting hint words, including retrieving terms from devices 200, selecting hint words therefrom, and sending the selected hint words to ASR interface 414 for transmission to ASR server 220. Storage 418 is memory available for any application and is available for storage of terms or other data retrieved from device 200, selected hint words, or the like.

The device 400 may be any electronic device capable of electronic communication with other devices and selection of hint words. For example, the device 400 may be a server, or a networked in-home smart device connected to a home modem and thereby to various devices 200. The device 400 may alternatively be a laptop computer or desktop computer configured as above.

ASR server 220 may be any server configured to run an ASR application program and may be configured similar to server 400 of FIG. 4 with the exception of storing one or more ASR modules in memory 410 rather than device interfaces 412, ASR interface 414, and hint words module 416.

FIG. 5 depicts an illustrative data structure for hint words, in accordance with some embodiments of the disclosure. In some embodiments, a set of hint words may be a first-in-first-out (FIFO) data structure where a new term is added, and the oldest term is discarded. Some embodiments may use data structures that comprise a hierarchical data structures, trees, linked lists, queues, playlists, matrices, tables, blockchains, text files, programming objects, and/or various other data structures. FIG. 5 depicts an illustrative data structure in hint words data structure 500.

Hint words data structure 500 comprises multiple phrases such as phrases 510, 520, 530, 540, 550, 560, and 570. Phrases in hint words data structure 500 may be populated with terms such as terms found in hint word list 120 of FIG. 1. Each phrase of hint words data structure 500 has fields, such as fields 562-568. For instance, phrase 560 has a phrase 562 of "PHRASE N," language 564 as "en-US" for U.S.-based English, codec 565 as FLAC, exemplary universal resource indicator (URI) 566 of "xyz:// . . . /phraseN.flac," and timestamp 568 of "2021-06-25 12:47 PM." Timestamp 568 is the most recent of the timestamps while timestamp 518 is the oldest. In some embodiments, a timestamp indicates creation and/or last use of the term. In some embodiments, e.g., where the set of hint words is a FIFO data structure and filled to maximum capacity, the newest term, phrase 560, would be added and the oldest term, phrase 510, would be discarded. In some embodiments, e.g., where the set of hint words is governed by an expiration time (e.g., 2 hours, 48 hours, 5 days, etc.), each phrase may be deleted at a certain point after the corresponding timestamp. For instance, timestamp 518 of phrase 510 indicates "2021-06-25 10:18 AM." If hint words data structure 500 has an expiration timer of, e.g., three hours, then phrase 510 will be deleted at 1:18 PM. In some embodiments, each term in a set of hint words may have a timestamp and an individual expiration term. Process 800 of FIG. 8 illustrates a potential method of determining if one or more words from the plurality of words should be removed from a set of hint words.

Figure 6:
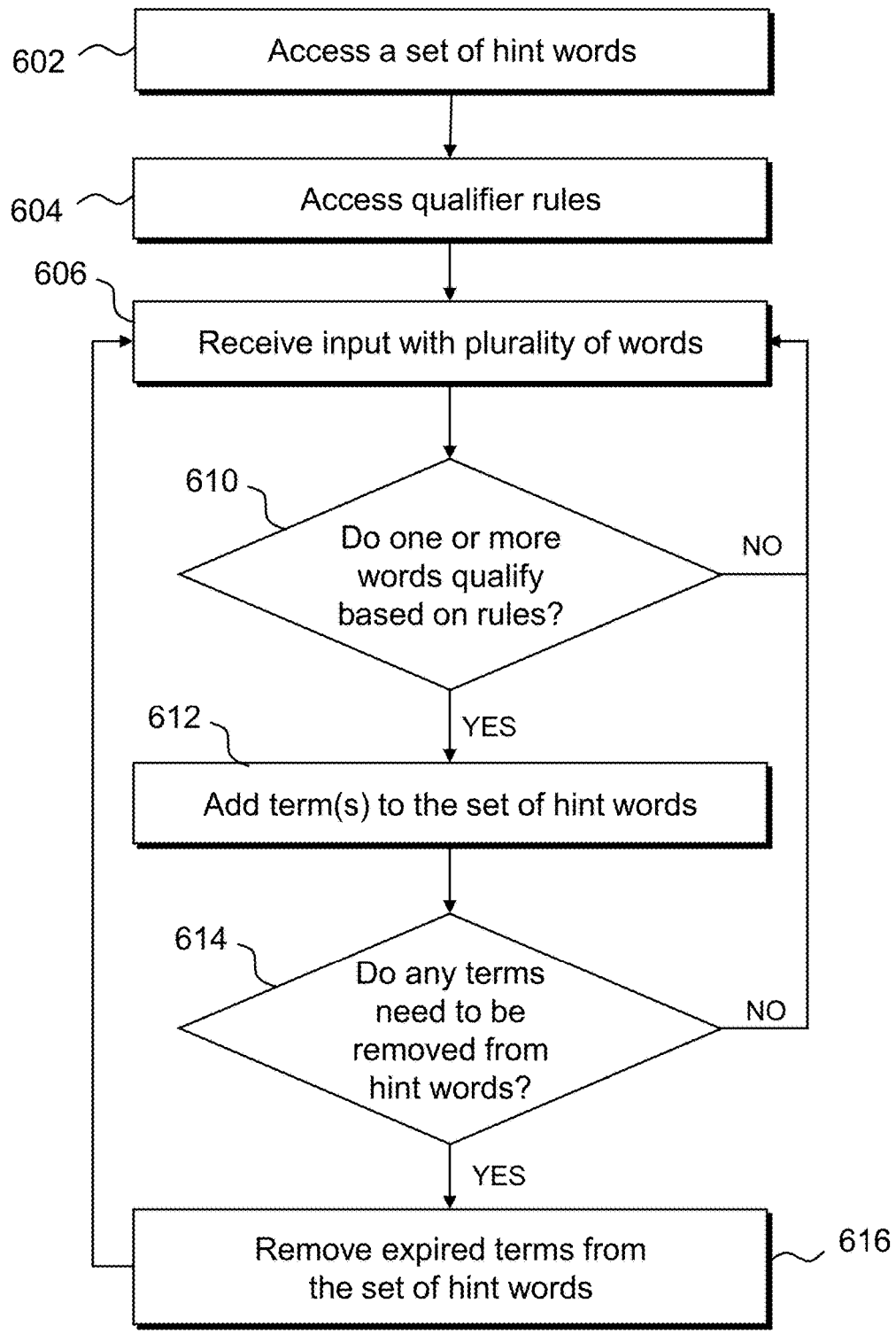
FIG. 6 depicts an illustrative flowchart of a process for adding and/or removing terms from a set of hint words, in accordance with some embodiments of the disclosure.
Figure 7:
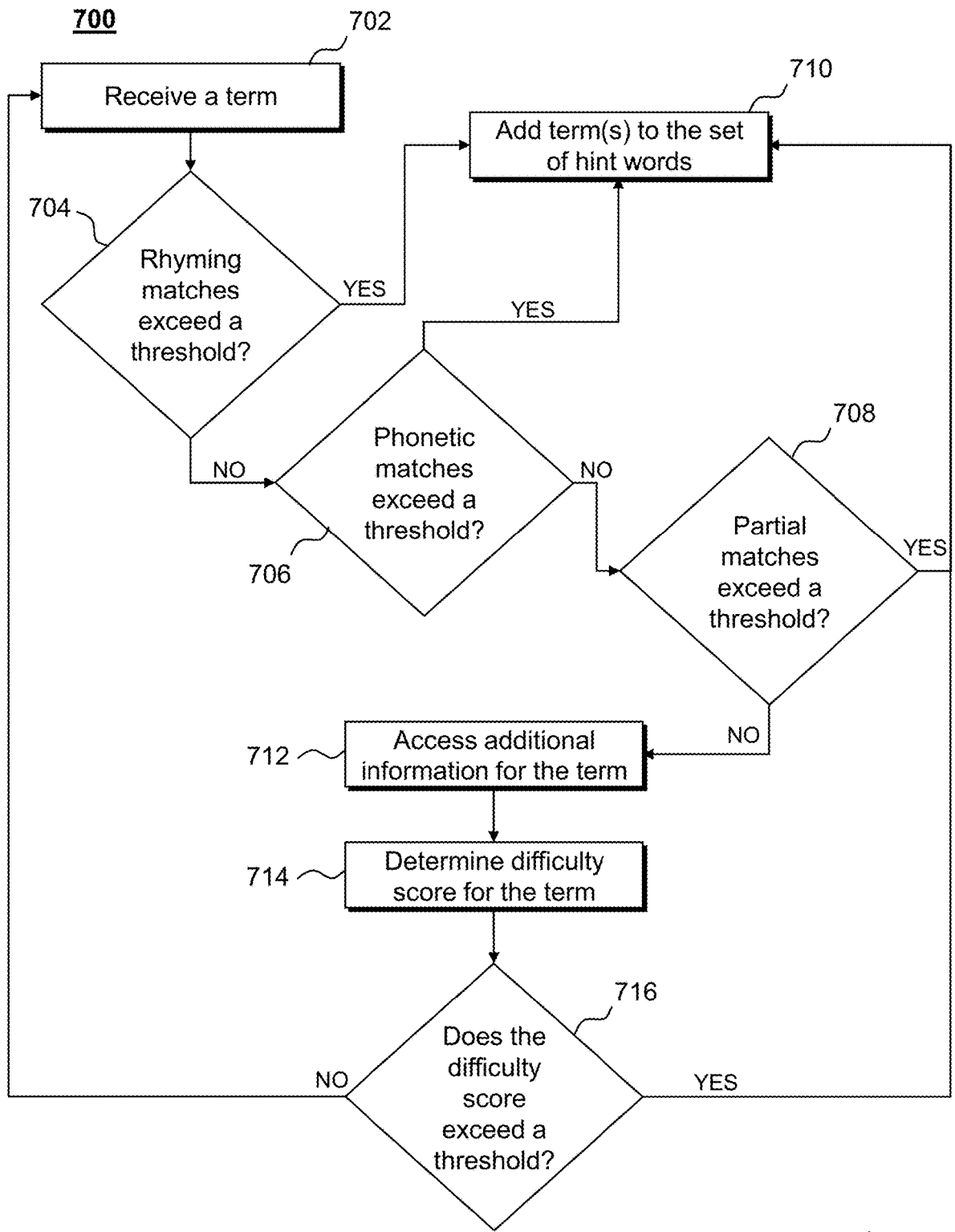
FIG. 7 depicts an illustrative flowchart of a process for adding terms from a set of hint words, in accordance with some embodiments of the disclosure.

FIG. 6 depicts an illustrative flowchart of a process for adding and/or removing terms from a set of hint words, in accordance with some embodiments of the disclosure. There are many ways to add and/or remove terms from a set of hint words, and process 600 of FIG. 6 is an exemplary method.

Some embodiments may utilize a hint words engine to perform one or more parts of process 600, e.g., as part of an ASR platform or interactive application, stored and executed by one or more of the processors and memory of a device and/or server such as those depicted in FIGS. 2-4. For instance, a hint words engine (or hint words module) may run on a server of a computing device, ASR server, and/or conversation processing server. A hint words engine may run on a component of a computing device with a virtual assistant, e.g., speaker, microphone, television, set-top box, computer, smartphone, tablet, or other device.

At step 602, a hint words engine accesses a set of hint words. For instance, an exemplary list of hint words is depicted in hint words data structure 500 of FIG. 5. An example of a (brief) set of hint words may be hint words list 120 depicted in scenario 100 of FIG. 1.

At step 604, the hint words engine accesses a set of qualifier rules. In some embodiments, qualifier rules instruct on how terms qualify to be added to the hint words list. In some embodiments, qualifier rules may include meeting or exceeding a threshold for one of several criteria. For instance, a term with more than, e.g., 3 syllables may qualify. A term with, e.g., at least two phonetic matches may qualify. A term with, e.g., four (or more) rhyming matches may qualify. A term with, e.g., (at least) two partial matches may qualify. In some embodiments, a difficulty score may be attributed to a term and if the difficulty score meets or exceed a threshold it may qualify. For instance, a difficulty score may be calculated based on complexity of the term's definition or encyclopedia entry on, e.g., Wikipedia®. Process 700 of FIG. 7 illustrates a potential method of using a set of qualifier rules to determine if one or more words qualify to be added to a set of hint words.

At step 606, the hint words engine receives input with a plurality of words. For instance, the hint words engine may receive one or more words captured by a microphone as part of a conversation or played back media content. Scenario 100 of FIG. 1 depicts capture, by device 101, of a plurality of words from dialogue 104 from a content item played back by device 102. Scenario 100 of FIG. 1 also depicts capture, by device 101, of a plurality of words from conversation 114 between two nearby content consumers. In some embodiments, the words may be in audio and need to be converted to text or another machine-readable format. In some embodiments, the words may be text, e.g., from a voice-to-text module. In some embodiments, the input may be just one word.

At step 610, the hint words engine determines if one or more words from the plurality of words qualify to be added to the hint word list based on the qualifying rules. Process 700 of FIG. 7 illustrates a potential method of determining if one or more words from the plurality of words qualify to be added to a hint word list. Scenario 100 of FIG. 1 depicts terms "subpoena" and "exculpatory" from dialogue 104, as well as "precedent" from conversation 114, as determined to qualify to join a hint words list.

If the hint words engine determines that one or more words from the plurality of words qualify to be added as hint word list based on the qualifying rules, at step 612, the hint words engine adds the term(s) to the set of hint words. For instance, terms that meet the qualifying rules may be added to a hint word list. Scenario 100 of FIG. 1 depicts terms "subpoena" and "exculpatory" from dialogue 104, as well as "precedent" from conversation 114, as determined to qualify to join a hint words list 120 and are added as terms 123, 124, and 125, respectively. In some embodiments, adding a term to a hint word list may comprise creating a new entry in a hint word data structure. The terms and phrases in hint words data structure 500 of FIG. 5 each met the qualifications and were added. In some embodiments, adding a term to a hint word list may comprise creating a new entry in a hint words file with the term/phrase and a link to the audio recording along with metadata, such as a timestamp, language, format (e.g., codec, compression, etc.), and other information.

If the hint words engine determines, at step 610, that none of the plurality of words qualify to be added as hint word list based on the qualifying rules, the hint words engine waits to receive the next input (step 606).

At step 614, the hint words engine determines if any terms need to be removed from the set of hint words. Process 800 of FIG. 8 illustrates a potential method of determining if one or more words from the plurality of words should be removed from a set of hint words. In some embodiments, a hint word set may be a finite list of hint words and may need to make room for addition of a new term. A set of hint words may have a maximum capacity of, e.g., 50, 100, 1500 terms and/or phrases. For instance, when a new term is added, and older term may be discarded. In some embodiments, a set of hint words may be a FIFO data structure where a new term is added and the oldest term is discarded. In some embodiments, a set of hint words may have an expiration term (e.g., 2 hours, 48 hours, 5 days, etc.) as to when it should be removed based on timestamp for creation and/or last use of the term. For instance, a term from a set of hint words may be removed from the set automatically when, e.g., 3 days has passed since it was added (or last heard). In some embodiments, each term in a set of hint words may have a timestamp and an individual expiration term. In some embodiments, the set of hint words may not have a set limit of terms but may be pruned based on rules to optimize access and phrase comparisons. In some embodiments, if a hint word has been used before an expiration date, the term may be moved to another list of hint words, e.g., hint words from queries.

If the hint words engine determines, at step 614, any terms need to be removed from the set of hint words, at step 616, the hint words engine removes the identified terms from the set of hint words. In some embodiments, the removed terms may be stored in another list. The hint words engine then waits for further input at step 606. If the hint words engine determines, at step 614, that no terms need to be removed from the set of hint words, the hint words engine also waits for further input at step 606.

FIG. 7 depicts an illustrative flowchart of a process for adding terms from a set of hint words, in accordance with some embodiments of the disclosure. There are many ways to add terms from a set of hint words, and process 700 of FIG. 7 is an exemplary method. For instance, process 700 may be considered a qualifying system that determines if a term qualifies to be stored in a set of hint words. Some embodiments may utilize a hint words engine to perform one or more parts of process 700, e.g., as part of an ASR platform or interactive application, stored and executed by one or more of the processors and memory of a device and/or server such as those depicted in FIGS. 2-4.

At step 702, the hint words engine receives a term. For instance, the hint words engine may receive one or more words captured by a microphone as part of a conversation or played back media content. In some embodiments, the words may be text, e.g., from a voice-to-text module. In some embodiments, the input may be multiple words (e.g., a phrase) or just one word.

At step 704, the hint words engine determines if the number of rhyming matches meets or exceeds a threshold. A rhyming match may be a count of any terms that rhyme with the term in question. For instance, if the word "subpoena" is determined to have at least, e.g., three words that rhyme with it qualifies for the hint list. If it is determined that "hyena," "arena," "demeanor," and other terms rhyme with "subpoena," then the term may qualify to be added to the hint list. If the rhyming matches threshold is met (or exceeded), the hint words engine adds the term(s) to the set of hint words at step 710. Some embodiments may incorporate a database of rhyming words.

At step 706, the hint words engine determines if the number of phonetic matches meets or exceeds a threshold. A phonetic match may be a count of any terms that are pronounced similarly to the term in question. For instance, if the word "precedent" is determined to have at least, e.g., one word that is pronounced similarly, it may qualify for the hint list. If it is determined that "president" is pronounced similar to "precedent," then the term may qualify to be added to the hint list. If the phonetic matches threshold is met (or exceeded), the hint words engine adds the term(s) to the set of hint words at step 710. Some embodiments may incorporate a database of phonetically matching words.

At step 708, the hint words engine determines if the number of partial matches meets or exceeds a threshold. A partial match may be a count of any terms that include a portion of the term in question. For instance, if the word "exculpatory" is determined to have at least, e.g., two words that share portions or syllables with it, the term may qualify for the hint list. If it is determined that "exculpatory" is a partial match to, e.g., "culpability" and "exculpate," then the term may qualify to be added to the hint list. If the partial matches threshold is met (or exceeded), the hint words engine adds the term(s) to the set of hint words at step 710. Some embodiments may incorporate a database of matching and/or partial matching words.

If the term did not reach a threshold for rhyming matches, phonetic matches, and/or partial matches, at step 712, the hint words engine accesses additional information for the term. For instance, the hint words engine may access the term's definition or encyclopedia entry on, e.g., Wikipedia®. An accessed definition may be traversed and each word in the definition may then be looked up for its respective definition as well until the definition is only basic units.

At step 714, the hint words engine determines a difficulty score for the term based on the accessed additional information for the term. In some embodiments, a difficulty score may be based on length of definition or encyclopedia entry accessed. In some embodiments, a difficulty score may be based on how deep a term's definition research goes. For instance, an accessed definition may be traversed and each word in the definition is looked up for its respective definition until a definition merely involves only basic unit phrases, it is no longer looked up. The difficulty score may be based on the number of call stacks from the root for a particular term. In some embodiments, a difficulty score may be based on syllables or length of the word. Some embodiments may incorporate a database for storing word difficulty levels.

At step 716, the hint words engine determines if the difficulty score meets or exceeds a threshold. For instance, if the difficulty score is beyond a threshold (e.g., three, six, or eight), then the word qualifies and is included. In some embodiments, meeting a threshold of syllables for the term may qualify the term as sufficient difficulty. If the difficulty score threshold is met (or exceeded), the hint words engine adds the term(s) to the set of hint words at step 710. If the difficulty score does not meet the threshold, then the term is discarded and process 700 repeats with a new term at step 702.

FIG. 8 depicts an illustrative flowchart of a process for removing terms from a set of hint words, in accordance with some embodiments of the disclosure. There are many ways to remove terms from a set of hint words, and process 800 of FIG. 8 is an exemplary method. Some embodiments may utilize a hint words engine to perform one or more parts of process 800, e.g., as part of an ASR platform or interactive application, stored and executed by one or more of the processors and memory of a device and/or server such as those depicted in FIGS. 2-4.

At step 802, the hint words engine analyzes a set of hint words. For instance, an exemplary list of hint words is depicted in hint words data structure 500 of FIG. 5. An example of a (brief) set of hint words may be hint words list 120 depicted in scenario 100 of FIG. 1.

At step 804, the hint words engine determines if the set of hint words has hit a maximum word limit. A set of hint words may have a maximum capacity of, e.g., 50, 100, 1500 terms and/or phrases. In some embodiments, a hint word set may be a finite list of hint words and may need to make room for addition of a new term. For instance, when a new term is added, and older term may be discarded. In some embodiments, a set of hint words may be a FIFO data structure where a new term is added to the list and the oldest term is discarded. If the hint words engine determines that the set of hint words has exceeded a maximum word limit then, at step 808, the hint words engine deletes the oldest term(s) from the set of hint words to meet the word limit. In some embodiments, a set of hint words may be considered a sliding window of hint words dynamically updated to add the newest term and discard the oldest term.

At step 806, the hint words engine determines if any word exceeded a time limit. In some embodiments, a set of hint words may have an expiration term (e.g., 2 hours, 48 hours, 5 days, etc.) as to when it should be removed based on timestamp for creation and/or last use of the term. For instance, a term from a set of hint words may be removed from the set automatically when, e.g., 3 days has passed since it was added (or last heard). is depicted in hint words data structure 500 of FIG. 5, each phrase is associated with a timestamp. The timestamp may indicate creation time, last use time, first use time, etc. In some embodiments, each term in a set of hint words may have a timestamp and an individual expiration term. In some embodiments, the set of hint words may not have a set limit of terms but may be pruned based on rules to optimize access and phrase comparisons. In some embodiments, if a hint word has been used before an expiration date, the term may be moved to another list of hint words, e.g., hint words from user queries. If the hint words engine determines that any word exceeded a time limit then, at step 808, the hint words engine deletes the expired term(s) from the set of hint words.

If the hint words engine determines that the set of hint words has not hit a word limit and that no word exceeded a time limit, at step 810, the hint words engine waits for a new word to be added to set of hint words before analyzing the set of hint words, again, at step 802.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of determining hint words for term recognition of audio input in automated speech recognition (ASR), the method comprising:

accessing one or more qualifier rules;
receiving a first audio input from a first audio source;
determining, using an automated speech recognition server, a first plurality of words from the first audio input;
determining a first term from the first plurality of words from the first audio input based on the one or more qualifier rules;
adding the first term to a set of hint words;
receiving, after the first audio input, a second audio input from a second audio source different from the first audio source;
transmitting, to the ASR server, the second audio input and the set of hint words;
determining, by the ASR server using the set of hint words, a second plurality of words from the second audio input, wherein the determined second plurality of words comprises the first term;
receiving, after the second audio input, a third audio input;
determining, using the ASR server, a third plurality of words from the third audio input;
determining a second term from the third plurality of words from the third audio input based on the one or more qualifier rules;
removing the first term from the set of hint words; and
adding the second term to the set of hint words.

2. The method of claim 1, wherein the removing is performed in response to adding the second term.

3. The method of claim 1, wherein the removing is performed in response to reaching a time limit.

4. The method of claim 1, wherein the removing is performed in response to the set of hint words reaching a predetermined size.

5. The method of claim 1, wherein the one or more qualifier rules comprises a rule that for a term at least one of the following is greater than a predetermined threshold: syllable count, phonetic matches, rhyming matches, and partial matches.

6. The method of claim 1, wherein the one or more qualifier rules comprises a rule that for a term compared to a predetermined word there is a match of at least one of the following types: phonetic, rhyming, and partial.

7. The method of claim 1, wherein the one or more qualifier rules comprises a rule that a term is determined to be a difficult term.

8. The method of claim 7, wherein the difficult term is determined by calculating a difficulty score based on accessing a definition of the term.

9. The method of claim 1, wherein the first audio source corresponds to an overheard content or conversation.

10. A system for determining hint words for term recognition in automated speech recognition (ASR), the method comprising:
input/output circuitry configured to receive a first audio input from a first audio source, receive, after the first audio input, a second audio from a second audio source different from the first audio source, and receive, after the second audio input, a third audio input; and
processing circuitry configured to:
access one or more qualifier rules;
determine, using an automated speech recognition server, a first plurality of words from the first audio input;
determine a first term from the first plurality of words from the first audio input based on the one or more qualifier rules;
add the first term to a set of hint words;
transmit to the ASR server the second audio input and the set of hint words;
determine, by the ASR server using the set of hint words, a second plurality of words from the second audio input, wherein the determined second plurality of words comprises the first term;
determining, using the ASR server, a third plurality of words from the third audio input;
determine a second term from the third plurality of words from the third audio input based on the one or more qualifier rules;
remove the first term from the set of hint words; and
add the second term to the set of hint words.

11. The system of claim 10, wherein the processing circuitry is further configured to remove in response to adding the second term.

12. The system of claim 10, wherein the processing circuitry is further configured to remove in response to reaching a time limit.

13. The system of claim 10, wherein the processing circuitry is further configured to remove in response to the set of hint words reaching a predetermined size.

14. The system of claim 10, wherein the one or more qualifier rules comprises a rule that for a term at least one of the following is greater than a predetermined threshold: syllable count, phonetic matches, rhyming matches, and partial matches.

15. The system of claim 10, wherein the one or more qualifier rules comprises a rule that for a term compared to a predetermined word there is a match of at least one of the following types: phonetic, rhyming, and partial.

16. The system of claim 10, wherein the one or more qualifier rules comprises a rule that a term is determined to be a difficult term.

17. The system of claim 16, wherein the processing circuitry is further configured to determine the difficult term by calculating a difficulty score based on accessing a definition of the term.

18. The system of claim 10, wherein the first source corresponds to an overheard content or conversation.

19. A method of determining hint words for automated speech recognition (ASR), the method comprising:
accessing one or more qualifier rules;
receiving a first audio input, wherein the first audio input comprises audio from overheard content or conversation;
determining, using an automated speech recognition server, a first plurality of words from the first audio input;
determining a first term from the first plurality of words from the first audio input based on the one or more qualifier rules;
adding the first term to a set of hint words;
receiving, after the first audio input, a second audio input;
determining the second audio input comprises the first term based at least in part on inputting to the ASR server the second audio input and the set of hint words;
receiving, after the second audio input, a third audio input;
determining, using the ASR server, a third plurality of words from the third audio input;
determining a second term from the third plurality of words from the third audio input based on the one or more qualifier rules;
removing the first term from the set of hint words; and
adding the second term to the set of hint words.

* * * * *